United States Patent
Griggio et al.

(10) Patent No.: US 11,799,870 B2
(45) Date of Patent: Oct. 24, 2023

(54) SYSTEM AND METHOD FOR THE MANAGEMENT OF MULTI-DOMAIN ACCESS CREDENTIALS OF A USER ABLE TO ACCESS A PLURALITY OF DOMAINS

(71) Applicants: Roberto Griggio, Curtarolo (IT); Ambrogio Simone Albamonte, Villafranca di Verona (IT)

(72) Inventors: Roberto Griggio, Curtarolo (IT); Ambrogio Simone Albamonte, Villafranca di Verona (IT)

(73) Assignees: Monokee S.R.L., Rovereto (IT); Roberto Griggio, Curtarolo (IT); Ambrogio Simone Albamonte, Villafranca di Verona (IT)

( * ) Notice: Subject to any disclaimer, the term of this patent is extended or adjusted under 35 U.S.C. 154(b) by 206 days.

(21) Appl. No.: 17/056,344

(22) PCT Filed: Apr. 15, 2020

(86) PCT No.: PCT/IB2020/053548
§ 371 (c)(1),
(2) Date: Nov. 17, 2020

(87) PCT Pub. No.: WO2020/212863
PCT Pub. Date: Oct. 22, 2020

(65) Prior Publication Data
US 2021/0226959 A1 Jul. 22, 2021

(30) Foreign Application Priority Data
Apr. 16, 2019 (IT) .................. 102019000005876

(51) Int. Cl.
*H04L 29/06* (2006.01)
*H04L 9/40* (2022.01)
*G06F 21/41* (2013.01)

(52) U.S. Cl.
CPC ............ *H04L 63/105* (2013.01); *G06F 21/41* (2013.01); *H04L 63/083* (2013.01); *H04L 63/0853* (2013.01); *H04L 63/0861* (2013.01)

(58) Field of Classification Search
CPC . H04L 63/105; H04L 63/083; H04L 63/0853; H04L 63/0861; H04L 9/3213;
(Continued)

(56) References Cited

U.S. PATENT DOCUMENTS 8,281,378 B2 * 10/2012 Anderson ............. H04L 9/3213
726/28
8,327,427 B2 * 12/2012 Soukup ............... H04L 63/0815
713/168

(Continued)

FOREIGN PATENT DOCUMENTS

EP 3 047 626 A1 10/2017
WO 2015/042546 A1 9/2014

OTHER PUBLICATIONS

A multi-domain role activation model, Abreu et al, May 2017 (Year: 2017).*

(Continued)

*Primary Examiner* — Jahangir Kabir
(74) *Attorney, Agent, or Firm* — Workman Nydegger

(57) ABSTRACT

A system for managing multiple-domain access credentials of a user enabled to access a plurality of domains. The system includes a credential management server wherein access credentials of the user are separately present for each of the domains, each of the access credentials including the access level of the user for each of the domains, a service device for interfacing the credential management server and at least a network server in turn including applications and resources related to at least a domain. The service device is configured to send to the credential management server an access request to a specific domain, and the credential
(Continued)

management server is configured to send to the service device the access credentials of the user for all the domains; consequently the service device is configured to send to the network server an access request to the specific domain, and the network server is configured to allow the user access such applications and resources of the specific domain based on the access level of the user.

9 Claims, 2 Drawing Sheets

(58) Field of Classification Search
CPC .............. H04L 63/0815; H04L 63/0807; G06F 2221/2113; G06F 21/335; G06F 21/41; G06F 21/32; G06F 21/6218
USPC ............................................................ 726/4

See application file for complete search history.

(56) References Cited

U.S. PATENT DOCUMENTS

| | | | |
|---|---|---|---|
| 8,898,732 B2* | 11/2014 | Qureshi | ................ H04L 63/102 709/227 |
| 9,847,990 B1* | 12/2017 | de Boursetty | ........ H04L 9/3236 |
| 2003/0074580 A1* | 4/2003 | Knouse | ............... H04L 63/0815 726/4 |
| 2008/0134295 A1* | 6/2008 | Bailey | ..................... G06F 21/30 726/4 |
| 2017/0034152 A1* | 2/2017 | Subramanya | ......... H04L 63/101 |
| 2018/0075231 A1* | 3/2018 | Subramanian | ...... H04L 63/0807 |
| 2020/0007531 A1* | 1/2020 | Koottayi | ............... H04L 67/146 |

OTHER PUBLICATIONS

International Search Report and Written Opinion dated Jul. 2, 2020, issued in PCT Application No. PCT/IB2020/053548, filed Apr. 15, 2020.
Oracle, *Siebel REST API Guide*, Jul. 31, 2016, XP05565044, retrieved from the Internet: https://docs.oracle.com/cd/E74890_01/books/PDF,RestAPI.pdf.

* cited by examiner

SYSTEM AND METHOD FOR THE MANAGEMENT OF MULTI-DOMAIN ACCESS CREDENTIALS OF A USER ABLE TO ACCESS A PLURALITY OF DOMAINS

BACKGROUND OF THE INVENTION

1. The Field of the Invention

The present invention relates to a system for managing multiple-domain access credentials of a user enabled to access a plurality of domains.

The invention also relates to a method for managing multiple-domain access credentials of a user enabled to access a plurality of domains.

2. The Relevant Technology

It is known that in the field of the Information and Communication Technologies (ICT), it is of utmost importance to rely on access management systems, also called "Access Management" (AM), which integrate technologies, criteria and procedures capable to allow various public and/or private organizations to ease and control access of users to critical applications and data, while protecting at the same time personal data from unauthorized access.

Various types of access management systems exist which implement different access services, among which it is known the so-called "Account Management" service that allows to create and manage user profiles for the use of a single computer system or of a single application.

Obviously, as just highlighted, such service allows, disadvantageously, to access exclusively the single application or the single computer system.

Alternatively, a single authentication service, so called "Single Sign-on" (SSO) exists, which enables a user to carry out a single authentication that is valid for more computer systems, applications or computer resources he is enabled to.

Still in more detail, such SSO service can be implemented with a centralized approach, wherein for example users of a single entity, such as a company, and thus of a single domain, have the possibility to access in a centralized manner all the computer applications and resources made available from the aforesaid company, depending on the access level of the specific user.

In the present framework the term "domain" means that more users, for example belonging to a company, share a database of network resources and applications, which are managed as a unit with common rules and procedures. In other words, a domain, in addition to a network server, where the aforesaid database is stored, and a plurality of service devices, such as personal computers or mobile devices, connected to such network server, comprises logic connection rules (policy) of the authorization type (security rules). In this framework, each user must be submitted to specific authentication procedures, defined by services that reside in the aforesaid network server. These procedures, which usually include a profile hierarchy (in terms of levels of permit and access to resources or applications), determine belonging or not to the domain, distribution structure and centralized sharing.

However, not even such SSO service centralized approach allows to manage the multiple-domain access of a single user enabled to access a plurality of domains.

The document "the Siebel REST API Guide" (31 Jul. 2016 (2016-07-31) Retrieved from the Internet: URL: https://does.oracle.com/cd/E74890_01/books/PDF/RestAPI.pdf) describes a system for managing multiple-domain access credentials of user enabled to access a plurality of domains.

The document EP 3047626 A1 describes a framework, conformed to the OAuth standard, which involves a generic OAuth authorization server that can be used by multiple resource servers in order to ensure that access to resources stored on those resource servers is limited to access to which the resource owner consents.

The document EP 3047626 A1 describes a framework, conformed to the OAuth standard, which involves a generic OAuth authorization server that can be used by multiple resource servers in order to ensure that access to resources stored on those resource servers is limited to access to which the resource owner consents.

In alternative, such SSO service can be implemented with a federated approach, that is an approach which allows a single enabled user to automatically access more domains that differ from each other by actually accessing one of them only.

However, disadvantageously, such a type of SSO service federated approach does not provide a single user interface configured to access such a plurality of domains, but on the contrary access occurs by means of the specific interfaces, that differ from each other, of the aforesaid domains.

SUMMARY OF THE INVENTION

The present invention intends to overcome all the mentioned drawbacks.

In particular, the object of the present invention is to create a system for managing multiple-domain access credentials of a user enabling said user to easily perform a single centralized authentication to all the domains he is enabled for.

A further object of the invention is to create a system for managing multiple-domain access credentials of a user which, while facilitating such single centralized authentication, allows to keep separate from each other access to the different domains which the user is enabled for.

In particular, it is an object of the invention to create a system for managing multiple-domain credentials which allows to manage the access of a single user to various domains with different access levels.

The said objects are reached by the system for managing multiple-domain access credentials of a user according to the main claim.

As regards further characteristics of the aforesaid management system of the invention, they are set forth in the dependent claims.

Part of the invention is also the method for managing multiple-domain access credentials of a user, according to claim 9.

BRIEF DESCRIPTION OF THE DRAWINGS

The aforesaid objects, together with the advantages that will be mentioned hereinafter, will be highlighted during the description of a preferred embodiment of the invention, which is given by way of non-limiting example with reference to the attached drawings, where.

DETAILED DESCRIPTION OF THE PREFERRED EMBODIMENTS

Figure 1:
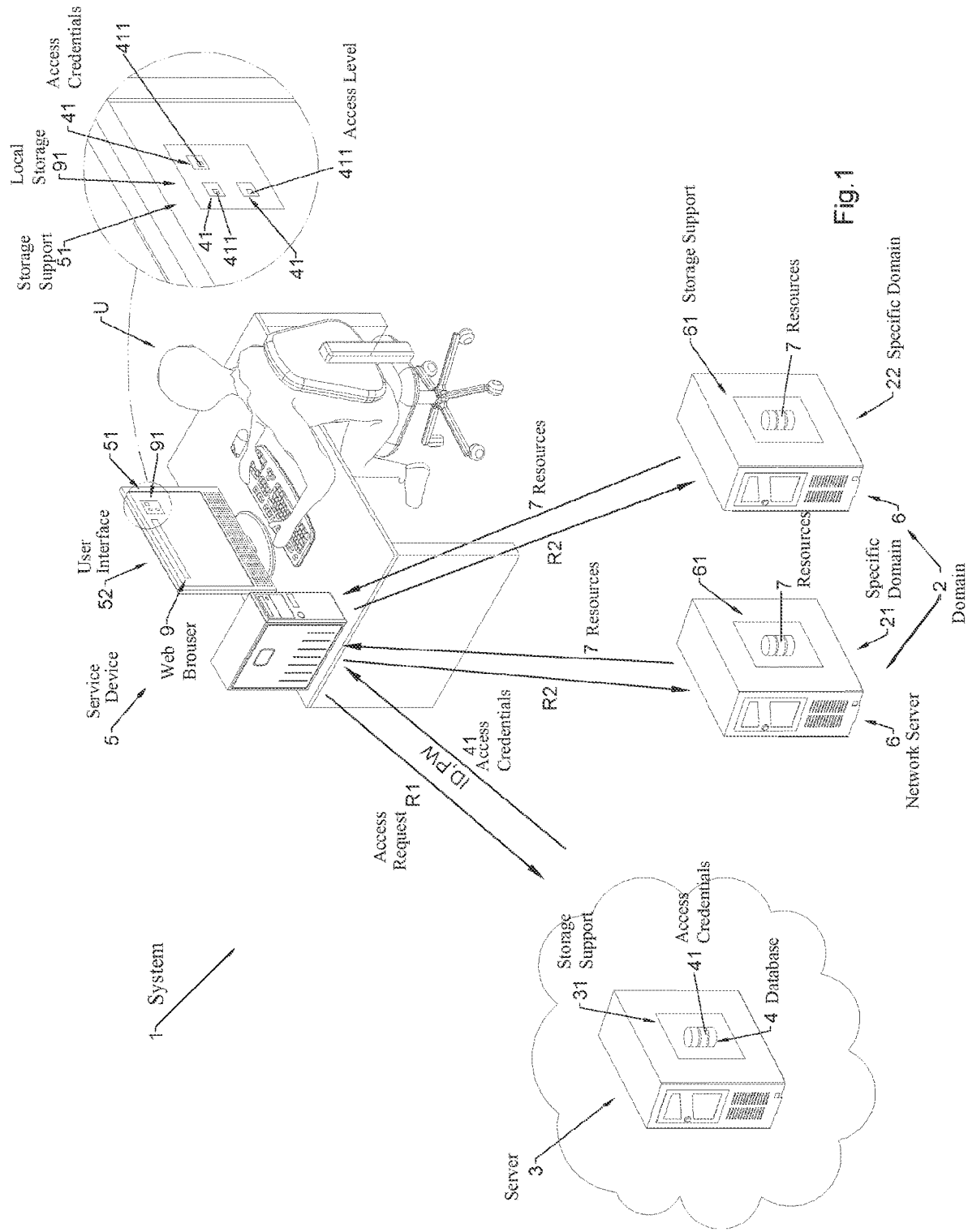
FIG. 1 schematically shows the system for managing multiple-domain access credentials of the invention.

The system for managing multiple-domain access credentials of a user U, enabled to access a plurality of domains 2, is schematically shown in FIG. 1, where it is generally indicated by 1.

In order to better describe the system 1 of the invention, let us consider, for example, that it is used in a group of several companies with a head company, such as a holding company, which controls a plurality of subordinate companies, where such holding company and each of the aforesaid subordinate companies is equipped with its own domain, independent from the domains of the other companies of the same group.

As already mentioned above, in the present framework the term "domain" means that more users, which in the example being considered can be the employees of a given company, share a database of network resources and applications and which are administered as a unit with common rules and procedures. In other words, a domain, in addition to a network server, where the aforesaid database is stored, and a plurality of service devices connected to such network server, comprises logic connection rules (policy) of the authorization type (security rules). In this framework, each user must be submitted to specific authentication procedures, defined by services that reside in the aforesaid network server. These procedures, which usually include a profile hierarchy (in terms of levels of permit and access to resources or applications), determine belonging or not to the domain, distribution structure and centralized sharing.

In the example just taken into consideration, one or more users (employees) of the aforesaid group can be enabled to access more domains of the aforesaid plurality of domains. In particular, one or more of the aforesaid users may be enabled to access such domains, with different levels of permit and access to resources or to specific applications of each domain.

Returning to the system 1 of the invention, it comprises a credential management server 3 comprising a storage support 31 wherein at least a database 4 is stored wherein access credentials 41 of each user U, for each of said domains 2, are separately present.

According to the invention, each of the aforesaid access credentials 41 comprises the user U access level 411, for each of the domains 2 which such user U is enabled to access.

According to a preferred embodiment of the invention, the access credentials 41 of each user U, for each domain 2, also comprise authentication and session tokens, which as will be specifically described hereinafter can be sent by cookies from the interface, in particular from the web browser, of a service device 5 available to the user U.

The system 1 of the invention also comprises such service device 5 available to the user U. Such service device 5 is provided with a storage support 51 and a user interface 52 for interfacing the credential management server 3 and a network server 6 which will be described hereinafter.

According to some preferred embodiments of the invention, such service device 5 can alternatively comprise a smartphone device, a tablet device, a desktop pc, a laptop. Generally, such service device 5 can be any electronic device capable to allow a user U to interface, by means of the aforesaid user interface 52, the aforesaid credential management server 3 and the aforesaid network server 6.

Further, according to the preferred embodiment of the invention, the user interface 52 is a web user interface made available to the user U, on the service device 5 thereof, by a web browser 9 residing in the latter and the storage support 51 is represented by the localStorage 91 of the aforesaid web browser 9.

In the ICT technical field and in the present framework, "localStorage" means a storage portion made available by a web browser for storing, generally, data that can be used by the web browser itself.

As regards the network server 6, according to the invention, it comprises a storage support 61 wherein applications and resources 7 related to each of the domains 2 are stored.

According to the preferred embodiment of the invention, each domain 2 comprises its own network server 6 wherein applications and resources 7 of the specific domain 2 are stored.

Furthermore, still according to the preferred embodiment of the invention system 1, the credential management server 3 is separate from the aforesaid network servers 6, where the credential management server 3 is a cloud server, while network servers 6 are local servers placed in the various aforesaid companies belonging to the aforesaid group of companies.

It is not excluded that also the aforesaid network servers 6 are cloud servers.

Still, it is not excluded that, according to different embodiments of the invention, a single network server 6 is provided wherein all the applications and resources 7 of all the aforesaid domains 2 are stored.

Furthermore, it is not excluded that, according to a further alternative embodiment of the invention, the credential management server 3 and the network server 6 are a single server comprising a storage support wherein both database 4 and applications and resources 7 related to each of the domains 2 are allocated.

According to the invention, the service device 5 is configured to allow the user U to send to the credential management server 3 by means of the interface 52, an access request R1 to a specific domain 21, among all the domains 2.

Preferably but not necessarily, such access request R1 comprises an identification ID of the user U related to the aforesaid specific domain 21 which the user U wants to access and a verification information PW associated to the identification ID, such as for example a password or/and a biometric identification.

Still more preferably, such identification ID is the specific email address of the user U for the specific domain 21.

The credential management server 3, according to the invention, as a response to such access request R1, is configured to verify the user U authenticity, and once authenticated it is configured to send to the server device 5 the access credentials 41 of the user U related to all the domains 2 which such user U is enabled to access.

Once received from the credential management server 3, such access credentials 41 are stored by the service device 5 in the storage support 51, in particular in the localStorage 91 of the web browser 9 used by the user U to send the access request R1 to the credential management server 3. It must be cleared that the access credentials 41 of all the aforesaid domains 2 which the user U is enabled to access are stored in the aforesaid localStorage 91 separately from each other.

Furthermore, the service device 5, always according to the invention, is configured to send to the network server 6 wherein the applications and resources 7 of the specific domain 21 which the user U wants to access are stored an access request R2 to such applications and resources 7. The aforesaid access request R2 provides, in particular, to send exclusively the access credential 41 related to the specific domain 21 and previously stored in said storage support 51.

In the present framework "send exclusively" means that the access request R2 to a specific network server 6 comprises specific access and security information for the aforesaid specific domain 21 and different from access and security information for accessing a different domain 2.

In this regard, two or more domains 2, each one managed by a specific network server 6, while belonging to the plurality of domains 2 of the same group of companies, will never be able to exchange one another access and security information. Therefore, the aforesaid two or more domains 2, due advantageously to the use of the system 1 of the invention, are independent and isolated from each other, while belonging to the aforesaid plurality of domains 2 of the same group of companies.

Preferably but not necessarily, such access request R2 sent by the service device 5 to the network server 6 also comprises a request for using one or more specific applications or one or more specific resources available to the aforesaid network server 6. Still more generally, such access request R2 comprises a request for using a specific domain 2 made available from the aforesaid network server 6.

According to the system 1 of the invention, the network server 6, as a response to such access request R2, is configured to allow the user U to access, by means of its own service device 5, applications and resources 7 of the aforesaid specific domain 21, based on the access level 411 the user U has related to such specific domain 21.

It is worth noting that, according to the system 1 of the invention, such access allows the user U to exclusively access applications and resources 7 of the specific domain 21. In other words, despite the aforesaid plurality of domains 2 is managed in a centralized manner by means of the aforesaid access management system 1 for the user U, each of the aforesaid domains 2 is actually independent from the others, and therefore access by a user U to a specific domain 2 is completely independent from possible access by the same user U to the other domains 2 belonging to the aforesaid plurality of domains 2.

According to the invention, preferably, the service device 2, once the aforesaid access credentials 41 of the user U related to all of the aforesaid domains 2 are available in the storage support 51, in particular in the localStorage 91 of the web browser 9, is configured to allow the user U, by means of said interface 52, to send to the network server 6 an access request R2 to a second specific domain 22, different from the aforesaid specific domain 21, sending exclusively access credentials 41 related to such second specific domain 22, advantageously, without having to send again to the credential management server 3 a further access request R1 to access the second specific domain 22.

In other words, referring to the above mentioned example, in case a user U belonging to the aforesaid group of companies and enabled to access more domains 2, each one associated to one of the aforesaid companies, already received the authorization to access a first specific domain 21 and, subsequently, required, in the same session, to access a second specific domain 22 different from the first one, the service device 5 is configured to send the aforesaid access request R2 to access the second specific domain 22. In particular, such access request R2 is sent to the network server 6 where applications and resources 7 of such second specific domain 22 are stored, with no need to send again the access request R1 to the access management server 3, as all the access credentials 41 are already made available to the service device 5 of the user U.

At this time, the network server 6, as a response to such access request R2, is configured to allow the user U to access by means of his own service device 5 applications and resources 7 of the aforesaid second specific domain 22 depending on the access level 41 of the user U for such second specific domain 22.

Preferably, according to the invention, the management system 1 of the invention is configured, once having permitted access to applications and resources 7 of such second specific domain 22, to close the access session to the first specific domain 21.

In other words, the system 1 of the invention allows to keep open a single session with respect to a single domain 2 of the aforesaid plurality of domains 2.

As previously mentioned, part of the invention is also the method for managing multiple-domain access credentials of a user U enabled to access a plurality of domains 2.

Figure 2:
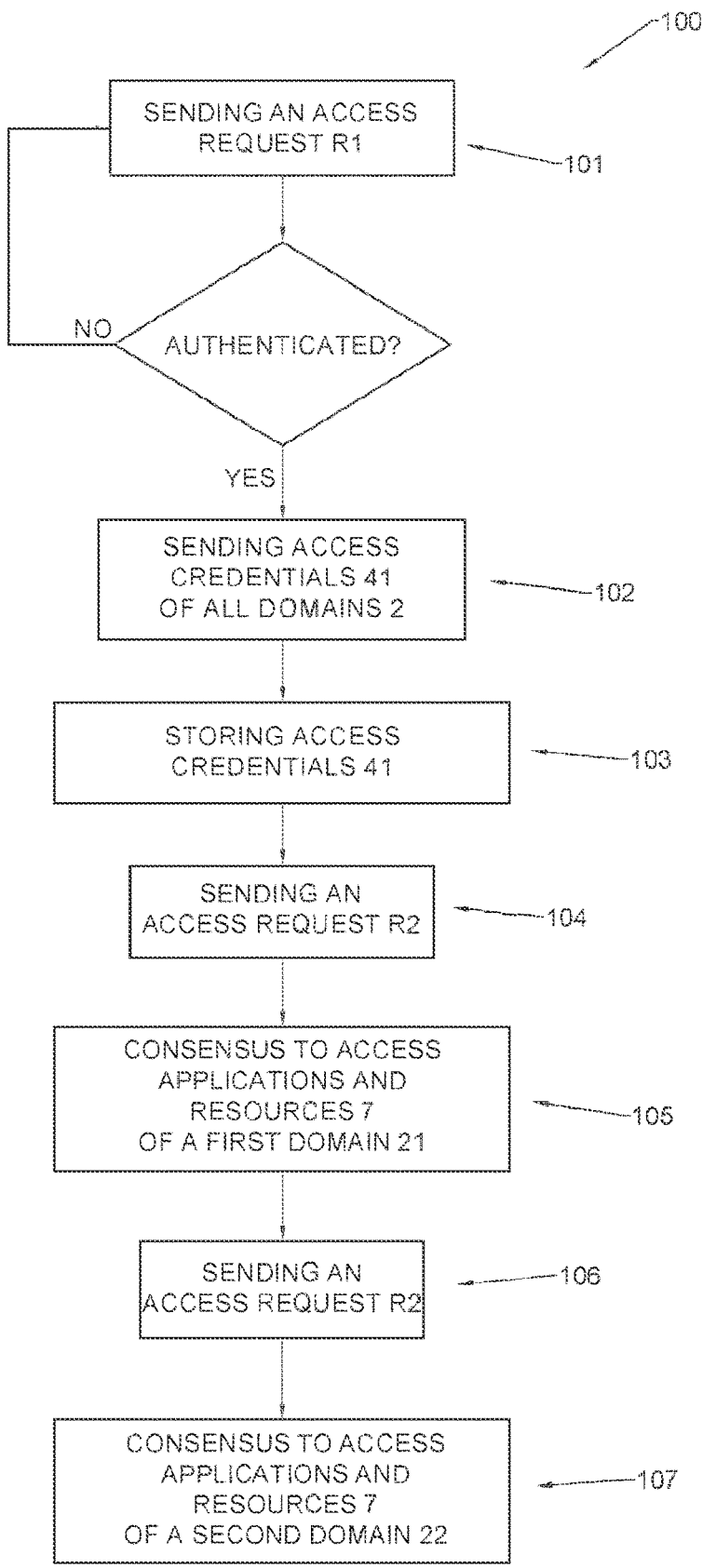
FIG. 2 shows the block diagram of the steps of the method for managing multiple-domain access credentials of the invention.

The steps of the method, according to the invention, are schematically shown in FIG. 2 where they are generally indicated by 100.

In particular, as it can be seen in FIG. 2, the method 100 of the invention comprises the step 101 of a user U sending, by means of a service device 5, an access request R1 to a specific domain 21 among all the domains 2. Such request is, in particular, sent to the aforesaid credential management server 3 wherein the access credentials 41 of the user U related to each of the domains 2 are separately present.

The method 100 provides in sequence the step 102 where the credential management server 3 sends, as a response to the aforesaid access request R1 and upon verification of the user U authenticity, the access credentials 41 of the user U for all the domains 2.

The following step 103 of the method 100 of the invention provides to store the aforesaid access credentials 41 in the storage support 53, preferably in the localStorage 91 of the web browser 9, of the service device 5 used by the user U to send the aforesaid access request R1.

Furthermore, the method 100 of the invention provides the step 104 of sending an access request R2 to access applications and resources 7 of the specific domain 21. Such access request R2 is sent to the network server 6 wherein the aforesaid applications and resources 7 related to such specific domain 21 are present. Such access request R2, in particular, according to the method 100 of the invention comprises access credentials 41 related exclusively to such specific domain 21.

Subsequently, as a response to the access request R2, the method 100 of the invention provides the step 105 in which the network server 6 grants consensus to the user U for accessing applications and resources 7 of the specific domain 21, based on the access level 41 granted to the user U, for such specific domain 21.

Furthermore, in case a user U already received authorization to access a first specific domain 21, thus once the access credentials 41 of all the domains 2 are already available in the storage support 51, more specifically in the aforesaid localStorage 91, and subsequently such user U required to access a second specific domain 22, different from the first one, the method 100 of the invention provides the step 106 of sending to the network server 6 wherein applications and resources 7 of the aforesaid second specific domain 22 are present an access request R2, to access the aforesaid applications and resources 7 of such second specific domain 22, with no need to send to the credential management server 3 the aforesaid access request R1.

In particular, such access request R2 according to the invention, comprises access credentials 41 related exclusively to such second specific domain 22.

At this time, the method 100 of the invention provides, as a response to such access request R2 sent by the network server 6, the step 107 of granting consensus to the user U to access the aforesaid applications and resources 7 of the second specific domain 22, depending on the access level 41 associated to the user U related to the aforesaid second specific domain 22.

As previously said, preferably, such access to the second specific domain 22 determines the closure of the access session to the first specific domain 21.

In other words, the method 100 of the invention allows to keep open only a session with respect to a single domain 2 of the aforesaid plurality of domains 2.

Based on the above, therefore, the system and the method of the invention for managing multiple-domain access credentials of a user enabled to access a plurality of domains reach all the set objects.

In particular, the object to create a system for managing multiple-domain access credentials of a user enabled to access a plurality of domains which allows said user to perform easily a single centralized authentication for all the domains for which access he is enabled is reached.

A further reached object is creating a system for managing multiple-domain access credentials of a user enabled to access a plurality of domains which, while facilitating such single centralized authentication, allows to keep access to the different domains, which such user is enabled to access, separate from each other.

In particular, the object to create a system for managing multiple-domain access credentials which allows to manage the access of a single user to various domains with different access levels is reached.

The invention claimed is:

1. A system for managing multiple-domain access credentials of a single user enabled to access a plurality of domains, said system comprising:
a server for managing credentials comprising a storage support wherein at least a database is stored wherein the access credentials of said user for each of said domains are separately present, each of said access credentials comprising the access level of said user for each of said domains, each one of said access credentials permitting access to only one domain of said plurality of domains;
a service device available to said user and provided with a storage support and a user interface for interfacing said credential management server and at least a network server;
said at least a network server comprising a storage support wherein the applications and resources related to at least one of said domains are stored;
said service device being configured to send to said credential management server, through said interface, an access request by said user to a specific domain among said domains, said credential management server, as a response to said access request and upon authenticity verification of said user, being configured to send to said service device the access credentials of said user for all of said domains, said service device being configured to store said access credentials in said storage support and to send to said network server an access request to said specific domain by sending access credentials exclusively related to said specific domain, said network server, as a response to said access request, being configured to enable said user to access by means of said service device said applications and resources of said specific domain based on the access level of said user for said specific domain;
said service device, once said access credentials are available in said storage support, being further configured to enable said user, by means of said interface, to send to said network server an access request to a second specific domain, different from said specific domain, by sending access credentials related exclusively to said second specific domain with no need to send to said credential management server an access request by said user to access said second specific domain, said network server, as a response to said access request, being configured to enable said user to access by means of said service device said applications and resources of said second specific domain regardless of said applications and said resources of said specific domain and based on the access level of said user for said second specific domain.

2. The system according to claim 1, wherein said access request of said service device to said credential management server comprises at least an identification of said user related to one of said domains and a verification information of said identification.

3. The system according to claim 2, wherein said verification information of said identification is a password or/and a biometric identification.

4. The system according to claim 1, further comprising a plurality of network servers, said applications and said resources of each of said domains being stored in one of said network servers.

5. The system according to claim 1, wherein said service device alternatively comprises a smartphone device, a tablet device, a desktop pc or a laptop.

6. The system according to claim 1, wherein said user interface is a web user interface made available to said user by means of a web browser residing in said service device, said storage support being the localStorage of said web browser.

7. The system according to claim 1, wherein said access credentials of said user for each of said domains comprise an authentication and session "token".

8. The system according to claim 1, wherein said access request of said service device to said network server comprises a request for using one or more specific applications or one or more specific resources belonging to said applications and said resources available to said network server.

9. A method for managing multiple-domain access credentials of a single user enabled to access a plurality of domains, said method comprising the steps of:
sending by said user by means of a service device an access request for the access of said user to one specific domain among said domains, said access request being sent to a credential management server wherein the access credentials of said user for each of said domains are separately present, each one of said access credentials permitting access to only one domain of said plurality of domains;
sending by said credential management server, as a response to said access request and upon verification of the authenticity of said user, the access credentials of said user for all of said domains;
storing said access credentials in a storage support of said service device;
sending an access request for the access to applications and resources of said specific domain, said access request being sent to a network server wherein said applications and said resources related to said specific domain are present, said access request comprising the access credentials exclusively related to said specific domain;

consensus to said user to access said applications and said resources of said specific domain from said network server, as a response to said access request, said access being granted based on the access level of said user for said specific domain;

said method comprising the additional steps of:

sending to said network server from said service device, once said access credentials are made available in said storage support, an access request for accessing a second specific domain, different from said specific domain, said access request comprising the access credentials related exclusively to said second specific domain, with no need to send to said credential management server an access request for the access of said user to said second specific domain;

consensus to said user to access said applications and said resources of said second specific domain from said network server, as a response to said access request, said access being granted based on the access level of said user for said second specific domain and regardless of said applications and said resources of said specific domain.

* * * * *